(12) United States Patent
Beller et al.

(10) Patent No.: US 10,147,051 B2
(45) Date of Patent: Dec. 4, 2018

(54) CANDIDATE ANSWER GENERATION FOR EXPLANATORY QUESTIONS DIRECTED TO UNDERLYING REASONING REGARDING THE EXISTENCE OF A FACT

(71) Applicant: International Business Machines Corporation, Armonk, NY (US)

(72) Inventors: Charles E. Beller, Baltimore, MD (US); William G. Dubyak, Severna Park, MD (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 14/974,327

(22) Filed: Dec. 18, 2015

(65) Prior Publication Data
US 2017/0177675 A1    Jun. 22, 2017

(51) Int. Cl.
| G06F 7/00 | (2006.01) |
| G06F 17/30 | (2006.01) |
| G06N 99/00 | (2010.01) |
| G06F 17/27 | (2006.01) |
| G06N 5/04 | (2006.01) |

(52) U.S. Cl.
CPC ....... *G06N 99/005* (2013.01); *G06F 17/2785* (2013.01); *G06F 17/30976* (2013.01); *G06N 5/04* (2013.01)

(58) Field of Classification Search
CPC .......... G06F 17/2785; G06F 17/30976; G06N 99/005; G06N 5/04
See application file for complete search history.

(56) References Cited

U.S. PATENT DOCUMENTS

| 6,263,335 B1 | 7/2001 | Paik et al. |
| 6,823,325 B1 | 11/2004 | Davies et al. |
| 8,131,540 B2 | 3/2012 | Marchisio et al. |
| 8,768,925 B2 | 7/2014 | Brown et al. |
| 8,943,095 B2 | 1/2015 | Gorman et al. |

(Continued)

OTHER PUBLICATIONS

Girju, Roxana, "Automatic Detection of Causal Relations for Question Answering", Association for Computational Linguistics, Proceedings of the ACL 2003 workshop on Multilingual summarization and question answering, vol. 12, Jul. 2003, 8 pages.

(Continued)

*Primary Examiner* — Azam Cheema
(74) *Attorney, Agent, or Firm* — Francis Lammas; Stephen J. Walder, Jr.; Diana R. Gerhardt

(57) ABSTRACT

A mechanism is provided for generating candidate answers to an explanatory question. Responsive to identifying an input question as the explanatory question, the explanatory question is decomposed into one or more explanatory queries. One or more passages are identified within a corpus of information that comprises an explanatory clause that provides an explanatory answer to the explanatory question based on pre-determined explanatory clause terms. Hypothesis evidence is received with one or passages comprising explanatory clauses from the corpus of information. One or more candidate explanatory answers are generated based on hypothesis evidence. The candidate explanatory answers are ranked and merged. Finally, the candidate explanatory answers are output.

19 Claims, 7 Drawing Sheets

(56) References Cited

U.S. PATENT DOCUMENTS

| | | | |
|---|---|---|---|
| 9,037,580 | B2 | 5/2015 | Brown et al. |
| 2002/0188586 | A1* | 12/2002 | Veale ................ G06F 17/30734 |
| 2003/0004706 | A1 | 1/2003 | Yale et al. |
| 2003/0074345 | A1* | 4/2003 | Baldwin ............... G06F 17/218 |
| 2007/0073533 | A1 | 3/2007 | Thione et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2014/0358890 | A1 | 12/2014 | Chen et al. |
| 2014/0365502 | A1* | 12/2014 | Haggar ............. G06F 17/30684 707/748 |

OTHER PUBLICATIONS

High, Rob, "The Era of Cognitive Systems: An Inside Look at IBM Watson and How it Works", IBM Corporation, Redbooks, Dec. 12, 2012, 16 pages.

Kumar, Praveen et al., "A fully automatic question-answering system for intelligent search in e-learning documents", Association for the Advancement of Computing in Education (AACE), International Journal on E-Learning, vol. 4, No. 1, Jan.-Mar. 2005, 13 pages.

Lee, Gary G. et al., "SiteQ: Engineering High Performance QA system Using Lexico-Semantic Pattern Matching and Shallow NLP", National Institute of Standards and Technology, Proceedings of the Tenth Text REtrieval Conference (TREC 2001), Gaithersburg, MD, Nov. 13-16, 2001, 10 pages.

McCord, M.C. et al., "Deep parsing in Watson", IBM J. Res. & Dev. vol. 56 No. 3/4 Paper 3, May/Jul. 2012, pp. 3:1-3:15.

Prager, John M. et al., "Special Questions and techniques", IBM, IBM Journal of Research and Development, vol. 56, No. 3/4, May/Jun. 2012, pp. 11:1-11:13.

Scragg, Greg W., "Answering process questions", Morgan Kaufmann Publishers, Proceedings of the 4th international joint conference on Artificial intelligence (IJCAI'75), vol. 1, Sep. 1975, Abstract only, 2 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

CANDIDATE ANSWER GENERATION FOR EXPLANATORY QUESTIONS DIRECTED TO UNDERLYING REASONING REGARDING THE EXISTENCE OF A FACT

GOVERNMENT RIGHTS

This invention was made with United States Government support under contract number 2013-12101100008. THE GOVERNMENT HAS CERTAIN RIGHTS IN THIS INVENTION.

BACKGROUND

The present application relates generally to an improved data processing apparatus and method and more specifically to mechanisms for generating candidate answers for explanatory questions directed to underlying reasoning regarding the existence of a fact.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating candidate answers to an explanatory question. The illustrative embodiment decomposed the explanatory question into one or more explanatory queries in response to identifying an input question as the explanatory question. The illustrative embodiment identifies one or more passages within a corpus of information that comprise an explanatory clause that provides an explanatory answer to the explanatory question based on pre-determined explanatory clause terms. The illustrative embodiment receives hypothesis evidence with one or passages comprising explanatory clauses from the corpus of information. The illustrative embodiment generates one or more candidate explanatory answers based on hypothesis evidence. The illustrative embodiment ranks and merges the candidate explanatory answers. The illustrative embodiment then outputs the candidate explanatory answers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
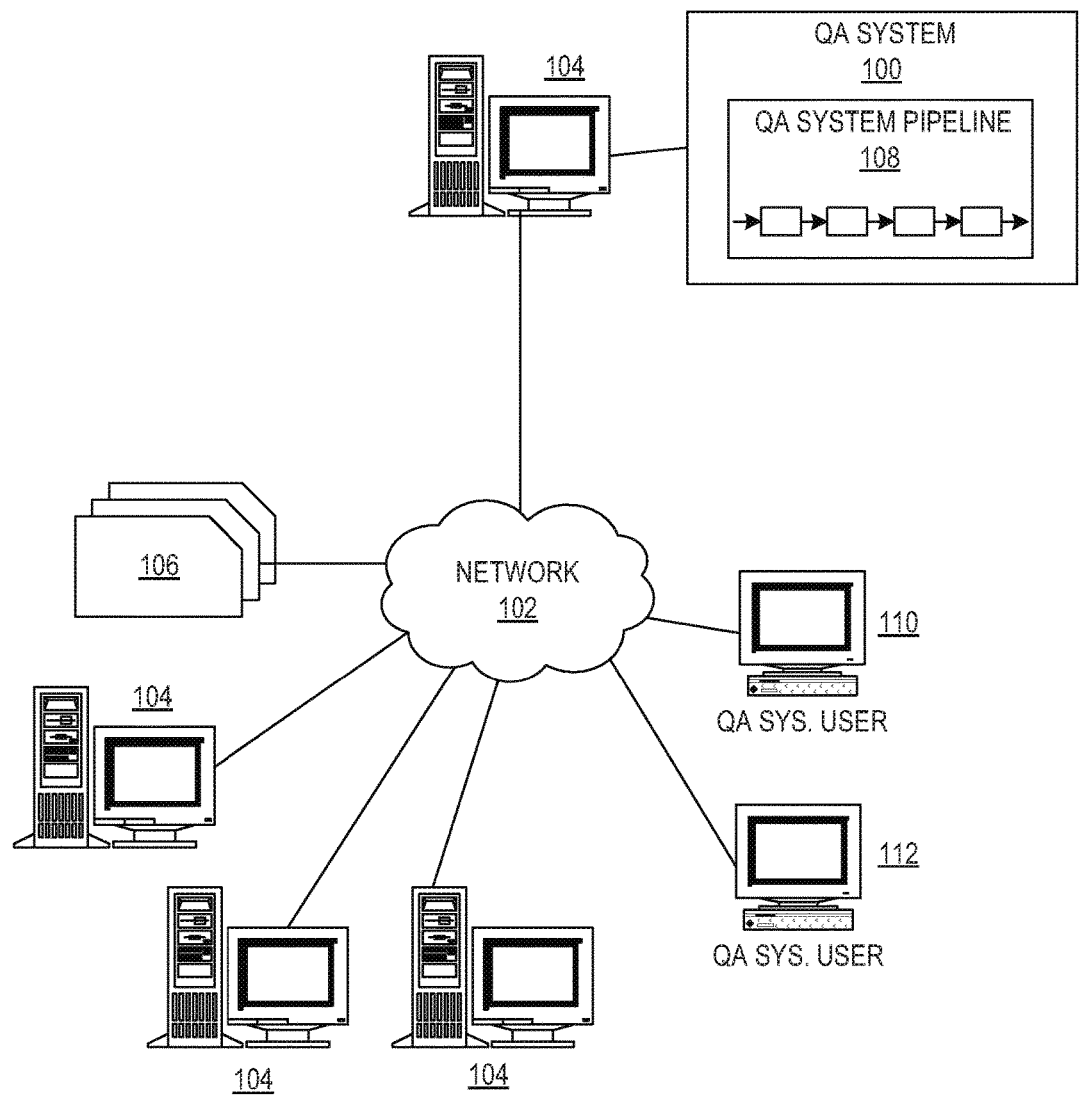
FIG. 1 depicts a schematic diagram of one illustrative embodiment of a question/answer creation (QA) system in a computer network.

A Question and Answer (QA) system is a sophisticated pipeline that performs in turn, question analysis, search query generation, passage retrieval, candidate answer generation, and answer ranking. The types of questions that may be correctly answered by such a QA system is limited by the types of candidate answers that may be generated. Most QA systems utilize a 'factoid-based' question and answering pipeline. That is, in QA systems that utilize a 'factoid-based' question and answering pipeline, there is no systematic way to generate answers for explanatory questions directed to an underlying reason for the existence of some fact, i.e. 'Why' questions, such as "Why do chickens cross roads?" This is true even in the event that the corpora being searched contains a passage that would provide an appropriate explanation to a human reader, such as "Chickens cross roads to get to the other side." While a QA system might provide candidate answers that contain an appropriate passage, the majority of answers would, at best, contain a single word or phrasal answer like 'side' or 'other side.' This is because explanatory questions are seeking explanations as to the underlying reasons for the existence of a particular fact. However, current QA systems generate candidate answers focused on factoid questions, which seek simple 'factoid-based' answers.

The illustrative embodiments provide mechanisms for answering questions seeking explanations of the underlying reasons for the existence of a particular fact, e.g., the fact is that chickens cross the road and the question "Why did the chicken cross the road?" is asking for the underlying reason for the fact that the chicken crossed the road. These types of explanatory questions are referred to herein as 'Why' questions and the illustrative embodiments provide mechanisms for generating candidate answers for such 'Why' questions by identifying and tagging explanatory clauses in the corpora that will be searched for answers to a 'Why' question. The mechanisms of the illustrative embodiments identify and tag 'Why' questions that seek explanations of underlying reasons for the existence of facts as answers, rather than 'factoid-based' answers which seek the facts themselves as answers. For those questions that are identified and tagged as 'EXPLANATORY' questions, the mechanisms of the illustrative embodiments analyze the questions to generate one or more explanatory search queries that are utilized to perform a search of the corpora. The identified answers with 'Why' question explanatory clauses are then identified as candidate answers and scored for relevancy to the 'Why' question. The scored candidate answers are then provided to the user.

In identifying and tagging explanatory clauses in the corpora that will be searched for answers to a 'Why' question, the mechanisms of the illustrative embodiments parse each document in the corpora to identify passages that contain explanatory clauses. For example, within each document of the corpora to be searched, the mechanisms of the illustrative embodiments identify and tag passages with 'for' clauses that include verb phrases ending in 'ing', such as "John wanted a new bow [for hunting]/[for hunting deer]." The mechanisms of the illustrative embodiments also identify and tag passages with 'for' clauses that include nouns, such as "John wanted a new bow [for security]/[for Mary]." Additionally, the mechanisms of the illustrative embodiments identify and tag passages with 'to' clauses that include verb phrases with infinitives, such as "John wanted a new bow [to hunt deer with]." Further, the mechanisms of the illustrative embodiments identify and tag passages with 'in order to' clauses as verb phrases, such as "John wanted a new bow [in order to impress his friends]." Still further, the mechanisms of the illustrative embodiments identify and tag passages with 'because' clauses as part of subordinate phrases, such as "John wanted a new bow [because he likes to hunt]." As a last example, the mechanisms of the illustrative embodiments identify and tag passages with 'so' clauses as part of subordinate phrases, such as "John wanted a new bow [so he could shoot farther]." These examples are only for illustrations. That is, the mechanisms of the illustrative embodiments may identify explanatory clauses utilizing any set of key terms or phrases determined to be associated with explanatory passages and other terms/phrases, e.g., "since," "the reason is," or the like.

The mechanisms of the illustrative embodiments may identify and tag passages with explanatory clauses based either on predefined rules or on statistical analysis (machine learning). When passages with explanatory clauses are identified and tagged at a time of ingest or prior to receiving an input question, the mechanisms of the illustrative embodiments parse each document in the corpora to identify passages with explanatory clauses by matching each identified clause in a passage to previous identified explanatory clauses (statistical) or comparing each identified clause in a passage to a predetermined set of explanatory clause rules (rule-based) that identify explanatory clauses. The predetermined set of explanatory clause rules indicating 'for' clauses that include verb phrases ending in 'ing', 'for' clauses that include nouns, 'to' clauses that include verb phrases with infinitives, 'in order to' clauses as verb phrases, 'because' clauses as part of subordinate phrases, 'so' clauses as part of subordinate phrases, or the like. While parsing each document in the corpora to identify passages with explanatory clauses and tag such passages with explanatory clauses at ingest time is costly in terms of time and processing resources, performing the identification and tagging at ingest time decreases answer generation processing at run-time because only tagged passages with explanatory clauses are searched for candidate answers.

When passages with explanatory clauses are identified at runtime (i.e. just-in-time identification), the mechanisms of the illustrative embodiments parse each document in the corpora to identify passages with explanatory clauses as part of the candidate answer generation with no comprehensive tagging needing to take place. Similar to the process performed at time of ingest, the mechanisms of the illustrative embodiments parse each document in the corpora to identify passages with explanatory clauses by matching each passage with an identified clause to previous identified explanatory clauses (statistical) or comparing each passage with an identified clause to a predetermined set of explanatory clause rules (rule-based) that identify explanatory clauses. However, in performing the identification of explanatory clauses at runtime, answer generation processing increases because each passage in each document in the corpora is parsed for explanatory clauses rather than only tagged passages with explanatory clauses. While in runtime identification of passages with explanatory clauses no comprehensive tagging is performed, the mechanisms of the illustrative embodiments may perform minor tagging only as needed. However, such tagging may be limited due to additional increase in the processing time and resources required to perform such tagging at runtime.

In identifying and tagging 'Why' questions that seek explanations as answers, the mechanisms of the illustrative embodiments may identify and tag 'Why' questions based either on a predetermined set of 'Why' question rules or on statistical analysis (machine learning). In statistical 'Why' question detecting, the mechanisms of the illustrative embodiments may initially identify and tag utilizing manually annotated questions that identify whether or not each question is seeking an explanation of an underlying reasoning as to the existence of a particular fact. Those questions that are identified as 'Why' questions seeking an explanation of an underlying reasoning as to the existence of a particular fact, rather than 'factoid-based' answers, are then utilized to train a question analysis mechanism to predict whether a question is seeking an explanation of an underlying reasoning as to the existence of a particular fact, e.g., "Why is the sky blue?". Once trained, the question analysis mechanism then predicts those questions seeking explanations of an underlying reasoning as to the existence of a particular fact and tags those questions as 'EXPLANATORY' questions.

In rule-based 'Why' question detection, the mechanisms of the illustrative embodiments may identify and tag questions as 'EXPLANATORY' questions based on a predetermined set of 'Why' question rules. For example, whether the question begins with "Why,", "For what reason," "How come," begins with "What" and ends with "for," or the like. Not only do the mechanisms of the illustrative embodiments tag those questions that are identified as 'Why' questions seeking an explanation based upon the rules as 'EXPLANATORY' questions, but those identified and tagged questions may also be utilized to train a question analysis mechanism to predict whether a question is seeking an explanation of an underlying reasoning as to the existence of a particular fact.

For a question that is identified as an 'EXPLANATORY' question, the mechanisms of the illustrative embodiments then search the corpora for passages containing explanatory clauses, whether pre-tagged or not depending on the type of identification and tagging of explanatory clauses that has been previously performed. If the corpora has been previously parsed to identify passages with explanatory clauses, then the mechanisms of the illustrative embodiments may query only those tagged passages for candidate answers to the identified "WHY" question. If the corpora has not been previously parsed to identify passages with explanatory clauses, then the mechanisms of the illustrative embodiments may query all passages for candidate answers to the identified "WHY" question.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
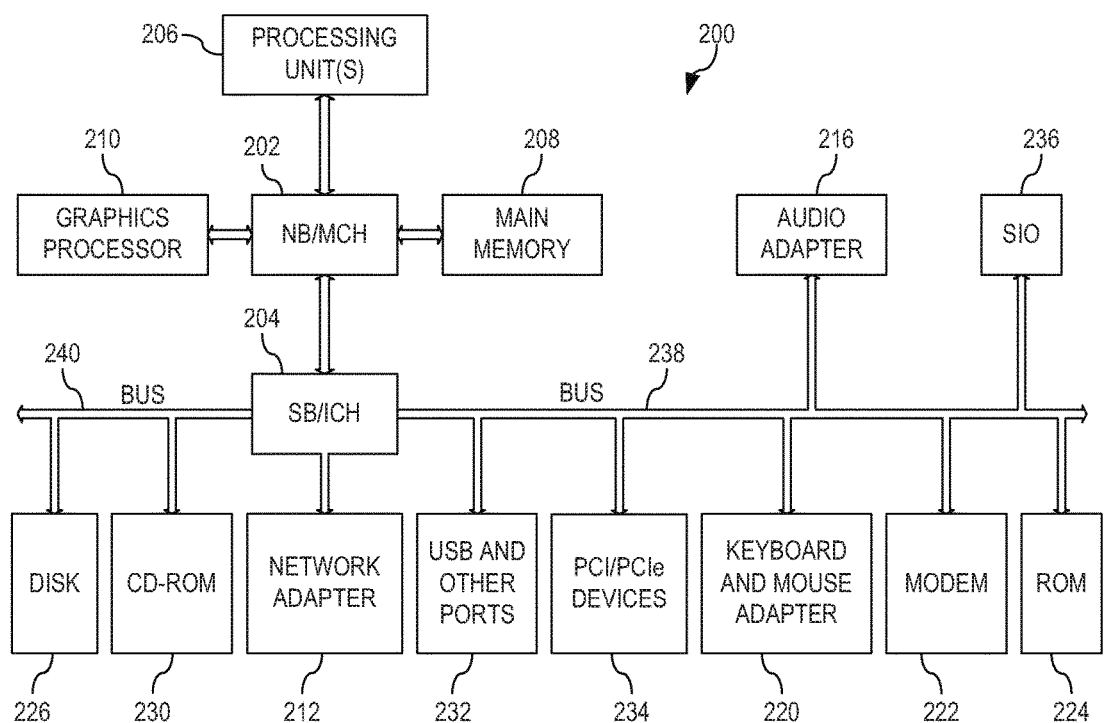
FIG. 2 is a block diagram of an example data processing system in which aspects of the illustrative embodiments are implemented.
Figure 3:
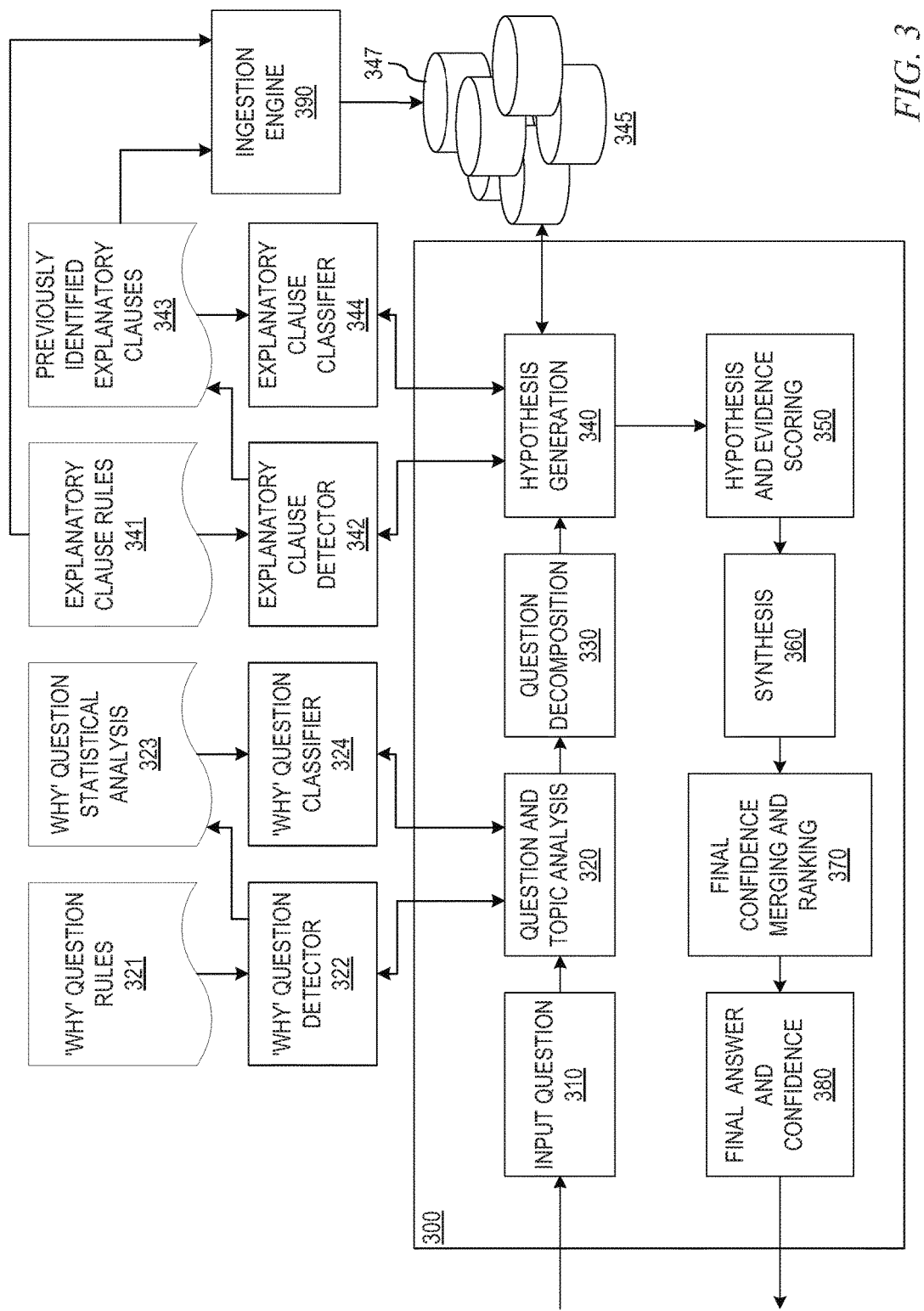
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to generating candidate answers for 'Why' questions.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, QA system users at clients 110, 112 submit questions to QA system 100, which generates candidate answers from corpus documents 106 for 'Why' questions. One or more reasoning algorithms or stages of QA system pipeline 108 are augmented, in accordance with the mechanisms of the illustrative embodiments, to include logic implemented in specialized hardware, software executed on hardware, or any combination of specialized hardware and software executed on hardware, for identifying and tagging 'Why' questions that seek explanations as answers, generating one or more explanatory search queries that are utilized to perform a search of the corpora, and identifying and tagging explanatory clauses in the corpora in order to generate candidate answers with explanatory clauses.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing a 'Why' input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. In addition, the extracted major features may include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word.

For example, in accordance with the illustrative embodiments, the question and topic analysis stage 320 is augmented to identify and tag 'Why' questions that seek explanations as answers. The question and topic analysis stage 320 may identify and tag 'Why' questions based either on a predetermined set of 'Why' question rules 321 using 'Why' question detector 322 or using 'Why' question statistical analysis (machine learning model) 323 using 'Why' question classifier 324. In statistical 'Why' question detection, 'Why' question classifier 324 utilizes the 'Why' question statistical analysis (machine learning model) 323 to identify 'Why' questions. Initially, 'Why' question classifier 324 utilizes manually annotated questions that identify whether or not each question is seeking an explanation of an underlying reasoning as to the existence of a particular fact. Those questions that are identified as 'Why' questions seeking an explanation of an underlying reasoning as to the existence of a particular fact are then utilized to train the 'Why' question statistical analysis (machine learning model) 323 to predict whether a question is seeking an explanation of an underlying reasoning as to the existence of a particular fact. Once trained, 'Why' question classifier 324 uses the 'Why' question statistical analysis (machine learning model) 323 to predict those questions seeking explanations of an underlying reasoning as to the existence of a particular fact. The question and topic analysis stage 320 then tags the question as a 'EXPLANATORY' question.

In rule-based 'Why' question detection, 'Why' question detector 322 utilizes the predetermined set of 'Why' question rules 321 that identify one or more beginning portions of questions, such as "Why," "For what reason," "How come," begins with "What" and ends with "for," or the like, to identify a questions as a 'Why' question. If question and topic analysis stage 320 utilizing 'Why' question detector 322 identifies that the input question corresponds with a rule from the predetermined set of 'Why' question rules 321, then the question and topic analysis stage 320 tags the question as an 'EXPLANATORY' question. Not only does the 'Why' question detector 322 tag those questions that are identified as 'Why' questions seeking an explanation of an underlying reasoning as to the existence of a particular fact based upon the rules as 'EXPLANATORY' questions, but 'Why' question detector 322 may provide the identified 'EXPLANATORY' question to the 'Why' question statistical analysis (machine learning model) 323 in order to improve the training of the 'Why' question statistical analysis (machine learning model) 323.

Therefore, for example, in the question "Why did John buy a bow?," the LAT may be the string "Why did." As another example, in the question "For what reason did John buy a bow?," the LAT may be the string "For what reason." The focus of a question is the part of the question that, if replaced by the answer, makes the question a standalone statement. For example, in the question "What did John want a bow for?", the focus is "What" since if this word were replaced with the answer it would make a correct statement. For example, the answer "for hunting" can be used to replace the term "what" to generate the sentence "For hunting, did John buy a bow.", or "John bought a bow for hunting." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more explanatory queries that are applied to the corpora of data/information 345 in order to generate one or more hypotheses. The explanatory queries are generated in any known or later developed query language, such as the Structure Query Language (SQL), or the like. The explanatory queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

In accordance with one illustrative embodiments, ingestion engine 390 may pre-analyzed each corpus 347 in corpora 345 at the time of ingest or prior to receiving the input question in order to identify explanatory clauses within the passages of each corpus 347. When passages with explanatory clauses within each corpus 347 are identified and tagged at the time of ingest, ingestion engine 390 parses each document to be added to the corpus 347 or each document already in the corpus 347 to identify explanatory clauses within the passages. Ingestion engine 390 may identify explanatory clauses by matching each identified clause within a passage to one of a set of previously identified explanatory clauses (statistical/machine learning model) 343 or by comparing each identified clause to a predetermined set of explanatory clause rules 341 that assist in identifying explanatory clauses. The predetermined set of explanatory clause rules 341 may indicate, for example, 'for' clauses that include verb phrases ending in 'ing', 'for' clauses that include nouns, 'to' clauses that include verb phrases with infinitives, 'in order to' clauses as verb phrases, 'because' clauses as part of subordinate phrases, 'so' clauses as part of subordinate phrases, or the like. The ingestion engine 390 then tags the identified explanatory clauses as 'EXPLANATORY.' Additionally, ingestion engine 390 may provide those explanatory clauses identified using the predetermined set of explanatory clause rules 341 may be appended to the set of previously identified explanatory clauses (statistical/machine learning model) 343 in order to improve those explanatory clauses identified using the set of previously identified explanatory clauses (statistical/machine learning model) 343.

In accordance with the illustrative embodiments, if each corpus 347 in corpora 345 has been pre-analyzed at the time of ingest or prior to receiving the input question in order to identify explanatory clauses within the passages of each corpus 347 and any identified explanatory clause has been tagged as 'EXPLANATORY,' then hypothesis generation stage 340 may limit analysis of corpora 345 to only those passages with clauses that are tagged as 'EXPLANATORY.' While parsing each document in each corpus 347 to identify explanatory clauses to identify and tag the identified clauses within the passages with an 'EXPLANATORY' tag at ingest time is costly in terms of time and processing resources, performing the identification and tagging at ingest time removes answer generation processing at run-time because only tagged passages with explanatory clauses are searched for candidate answers. When explanatory clauses are identified at runtime, the hypothesis generation stage 340 parses each document in each corpus 347 to identify explanatory clauses as part of the candidate answer generation with no comprehensive tagging needing to take place. While in runtime identification of passages with explanatory clauses no comprehensive tagging is performed, the hypothesis generation stage 340 may perform minor tagging only as needed. However, such tagging may be limited due to additional increases in the processing time and resources required to perform such tagging at runtime.

In the identification of explanatory clauses at runtime, hypothesis generation stage 340 may be augmented to identify explanatory clauses within the passages of each corpus 347 in corpora 345 at runtime (i.e. just-in-time identification). When passages with explanatory clauses are identified at runtime, the hypothesis generation stage 340 parses each document in each corpus 347 to identify passages with explanatory clauses as part of the candidate answer generation. The identification of explanatory clauses may be performed in either a statistical explanatory clause detection or in a rule-based explanatory clause detection. In statistical explanatory clause detection, explanatory clause classifier 344 identifies a passage with explanatory clauses by matching an identified clause within a passage to one of the set of previously identified explanatory clauses (statistical/machine learning model) 343. Initially, explanatory clause classifier 344 utilizes manually identified explanatory clauses that provide an answer to 'Why' questions and appends those identified explanatory clauses to the set of previously identified explanatory clauses (statistical/machine learning model) 343. Once trained, explanatory clause classifier 344 uses the set of previously identified explanatory clauses (statistical/machine learning model) 343 to predict explanatory clauses within corpora 345. The hypothesis generation stage 340 then tags the identified explanatory clauses within the passages as 'EXPLANATORY.'

In rule-based explanatory clause detection, explanatory clause detector 342 utilizes the predetermined set of explanatory clause rules 341 that assist in identifying explanatory clauses, such as 'for' clauses that include verb phrases ending in 'ing', 'for' clauses that include nouns, 'to' clauses that include verb phrases with infinitives, 'in order to' clauses as verb phrases, 'because' clauses as part of subordinate phrases, 'so' clauses as part of subordinate phrases, or the like, to identify explanatory clauses within each corpus 347. If hypothesis generation stage 340 utilizing explanatory clause detector 342 identifies an explanatory clause that meets one of the predetermined set of explanatory clause rules 341, then hypothesis generation stage 340 tags the identified explanatory clauses within the passages as 'EXPLANATORY.' Not only does the explanatory clause detector 342 tag the identified clauses within the passages as 'EXPLANATORY' based upon the predetermined set of explanatory clause rules 341, but explanatory clause detector 342 may also provide the identified explanatory clauses to the set of previously identified explanatory clauses (statistical/machine learning model) 343 in order to improve the training of the set of previously identified explanatory clauses (statistical/machine learning model) 343.

Therefore, the explanatory queries are applied to one or more databases storing information about the electronic texts, documents, articles, websites, and the like, that make up the corpus of data/information, e.g., the corpus of data 106 in FIG. 1. The explanatory queries are applied to the corpus of data/information at the hypothesis generation stage 340 to generate results identifying potential hypotheses for answering the input question, which may then be evaluated. That is, the application of the explanatory queries results in the extraction of passages from corpora 345 matching the criteria of the particular explanatory query, which, in accordance with the illustrative embodiments, may be performed utilizing the set of previously identified explanatory clauses (statistical/machine learning model) 343 or the predetermined set of explanatory clause rules 341.

These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact explanatory clause for "Why did John buy a bow?," and generate a score based on a frequency of use of exact explanations using the identified explanatory clauses. In such a case, exact matches will be given the highest scores, while clauses that do not include "John" or 'buy' may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the terms "John" and 'bow" in content of the corpus (also referred to as evidence, or evidence passages) is given a highest score. Instances of the exact matches and close matches, i.e. those including "John" or "bow" but not both, for each evidence passage may be compiled and used in a quantitative function to generate a score for the degree of matching of the evidence passage to the input question.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
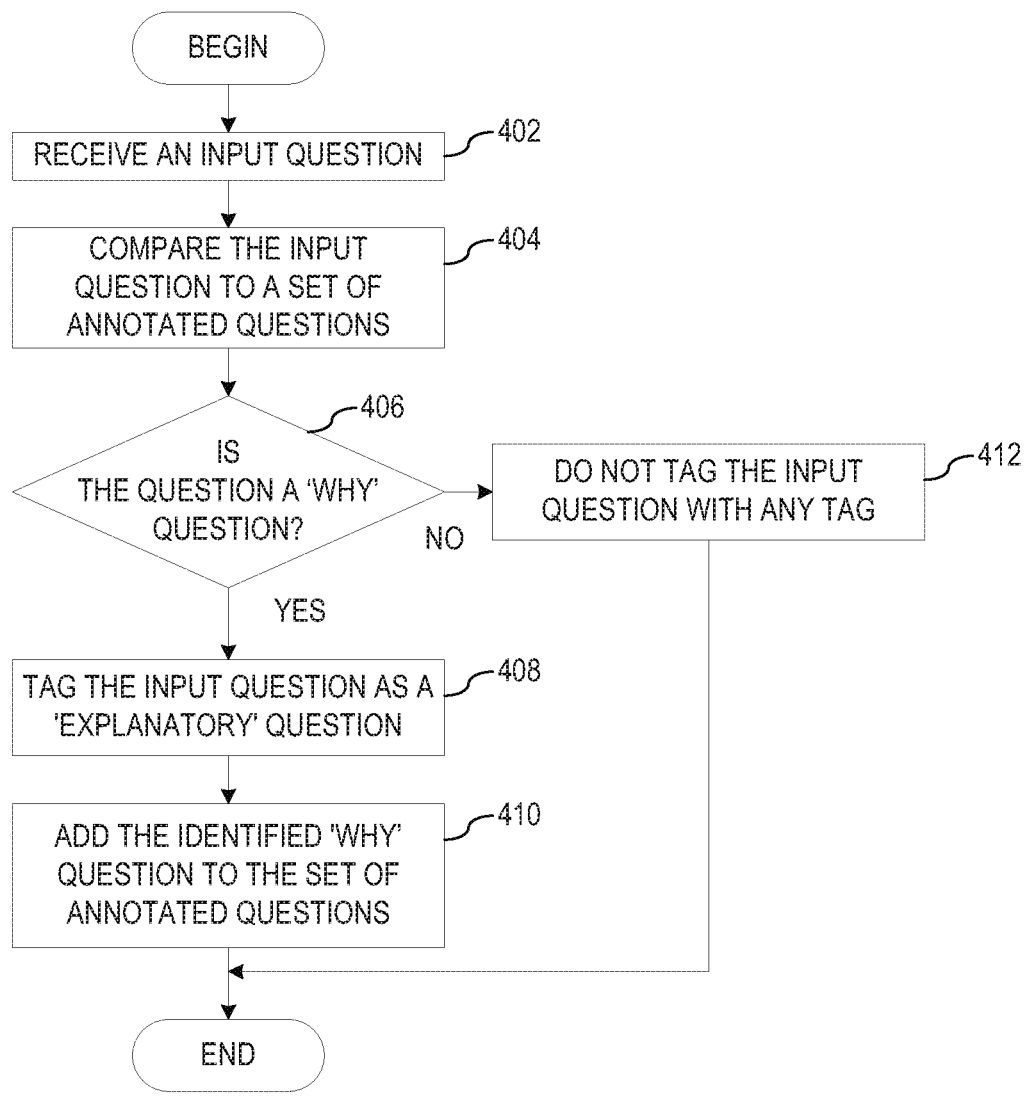
FIG. 4 depicts a flowchart illustrating an operation of a mechanism for identifying a 'Why' input question utilizing statistical analysis (machine learning model) detection in a QA system in accordance with an illustrative embodiment.

FIG. 4 depicts a flowchart illustrating an operation of a mechanism for identifying a 'Why' input question utilizing statistical analysis (machine learning model) detection in a QA system in accordance with an illustrative embodiment. As the operation begins, the mechanism receives an input question (step 402). The mechanism compares the input question to a set of annotated questions (step 404) in order to identify whether or not the input question is seeking an explanation of an underlying reasoning as to the existence of a particular fact, i.e. a 'Why' question (step 406). If at step 406 the input question is identified as a 'Why' question due to features of the input question corresponding to features of one or more of the set of annotated questions, then the mechanism tags the input question as a 'EXPLANATORY' question (step 408). The mechanism then adds the identified 'Why' question to the set of annotated questions for use in further training and prediction of future 'Why' questions (step 410), with the operation ending thereafter. If at step 406 the input question is identified as anything other than a 'Why' question, the mechanism does not tag the input question with any tag (step 416), with the operation ending thereafter.

Figure 5:
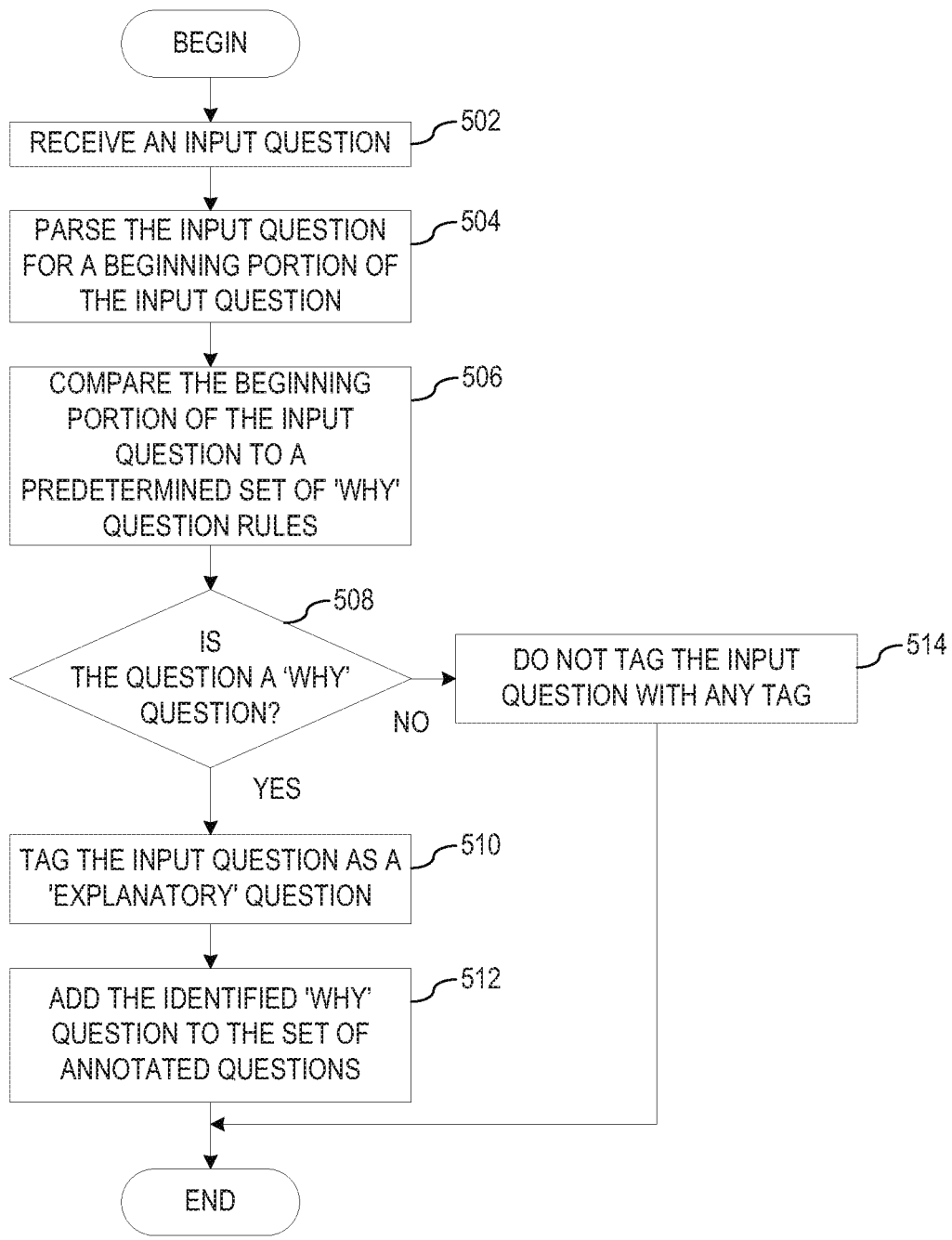
FIG. 5 depicts a flowchart illustrating an operation of a mechanism for identifying a 'Why' input question utilizing rule-based 'Why' question detection in a QA system in accordance with an illustrative embodiment.

FIG. 5 depicts a flowchart illustrating an operation of a mechanism for identifying a 'Why' input question utilizing rule-based 'Why' question detection in a QA system in accordance with an illustrative embodiment. As the operation begins, the mechanism receives an input question (step 502). The mechanism parses the input question for a beginning portion of the input question (step 504). The mechanism compares the beginning portion of the input question to a predetermined set of 'Why' question rules, such as "Why," "For what reason," "How come," begins with "What" and ends with "for," or the like (step 506) in order to identify whether or not the input question is seeking an explanation of an underlying reasoning as to the existence of a particular fact, i.e. a 'Why' question (step 508). If at step 508 the beginning portion of the input question corresponds to one of the predetermined set of 'Why' question rules, then the mechanism tags the input question as an 'EXPLANATORY' question (step 510). The mechanism then adds the identified 'Why' question to a set of annotated questions for use in further training and prediction of future 'Why' questions (step 512) as is described in FIG. 4, with the operation ending thereafter. If at step 508 the beginning portion of the input question fails to correspond to one of the predetermined set of 'Why' question rules, the mechanism does not tag the input question with any tag (step 514), with the operation ending thereafter.

Figure 6:
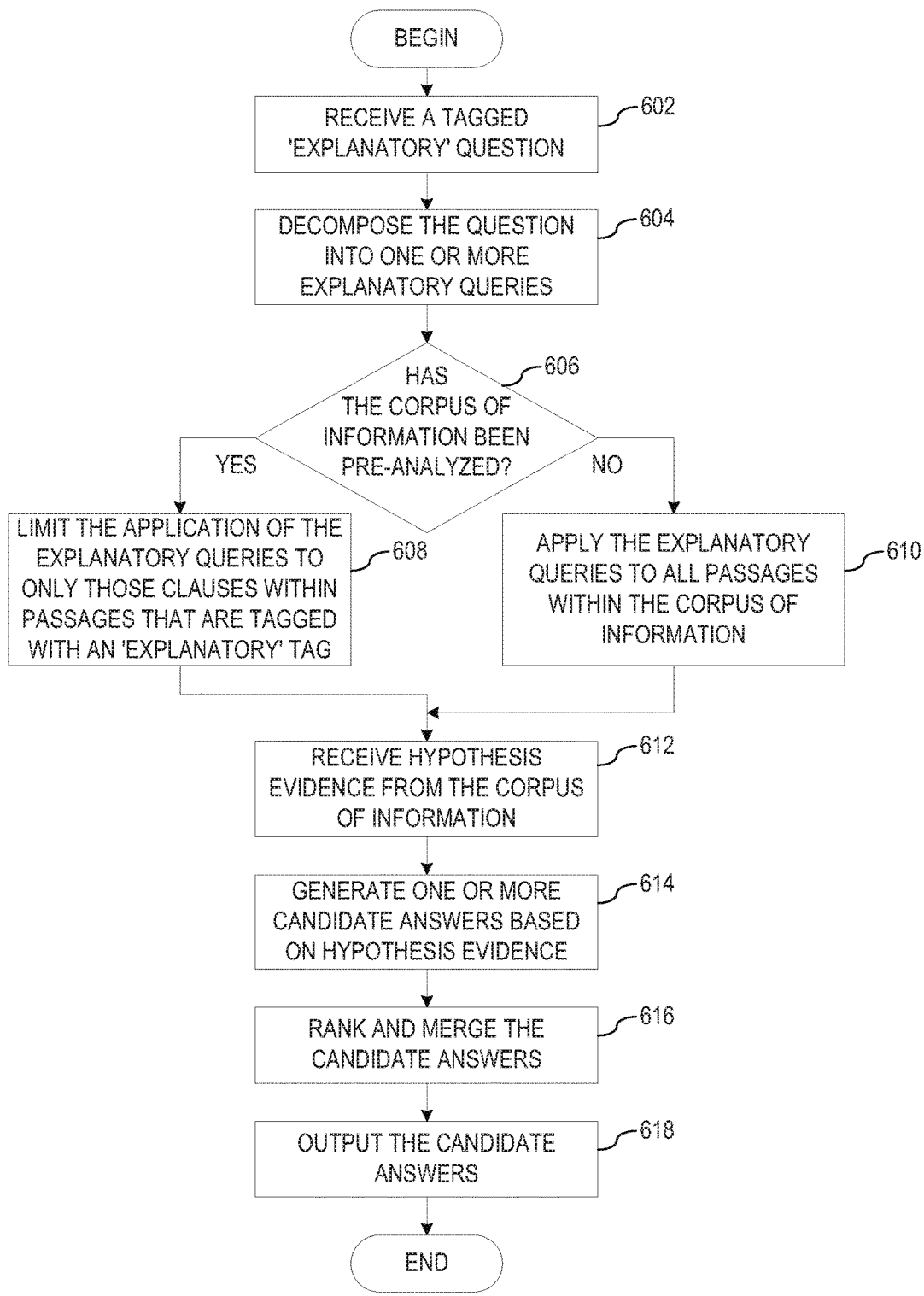
FIG. 6 is a flowchart illustrating operation of a mechanism for answering tagged 'EXPLANATORY' questions in accordance with an illustrative embodiment.

FIG. 6 is a flowchart illustrating operation of a mechanism for answering tagged 'EXPLANATORY' questions in accordance with an illustrative embodiment. As the operation begins, the mechanism receives a tagged 'EXPLANATORY' question (step 602). The mechanism decomposes the question into one or more explanatory queries (step 604). The mechanism then determines whether the corpus of information has been pre-analyzed to identify explanatory clauses (step 606). If at step 606 the corpus of information has been pre-analyzed to identify explanatory clauses, then the mechanism limits the application of the explanatory queries to only those passages with clauses that are tagged with an 'EXPLANATORY' tag (step 608). If at step 606 the corpus of information fails to have been pre-analyzed to identify explanatory clauses, then the mechanism applies the explanatory queries to all passages within the corpus of information (step 610). The identification of passages with explanatory clauses that are queried in the application of the explanatory queries are exemplified in FIG. 7 that follows. From step 608 or 610, the mechanism then receives hypothesis evidence with one or passages comprising explanatory clauses from the corpus of information (step 612). The mechanism then generates one or more candidate explanatory answers based on hypothesis evidence (step 614), ranks and merges the candidate explanatory answers (step 616), and outputs the candidate explanatory answers (step 618), with the operation ending thereafter.

Figure 7:
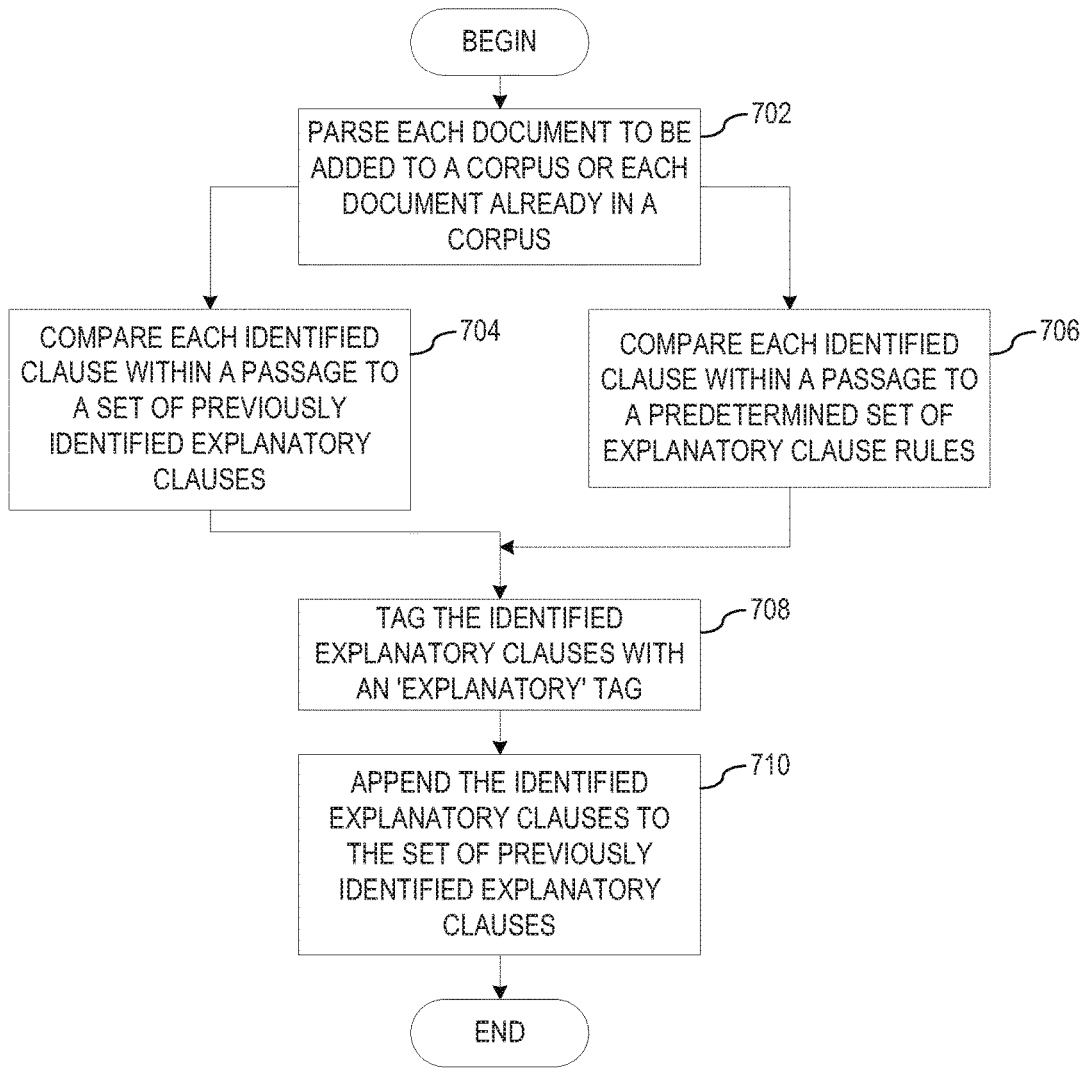
FIG. 7 depicts a flowchart illustrating an operation of a mechanism for detecting explanatory clauses in a QA system in accordance with an illustrative embodiment.

FIG. 7 depicts a flowchart illustrating an operation of a mechanism for detecting explanatory clauses in a QA system in accordance with an illustrative embodiment. As the operation begins, the mechanism parses each document to be added to a corpus of information or each document already in a corpus of information (step 702). From step 702, the mechanism may identify explanatory clauses by comparing each identified clause within a passage to a set of previously identified explanatory clauses (statistical/machine learning model) (step 704) or by comparing each identified clause within a passage to a predetermined set of explanatory clause rules (step 706). The predetermined set of explanatory clause rules may indicate, for example, 'for' clauses that include verb phrases ending in 'ing', 'for' clauses that include nouns, 'to' clauses that include verb phrases with infinitives, 'in order to' clauses as verb phrases, 'because' clauses as part of subordinate phrases, 'so' clauses as part of subordinate phrases, or the like. From either step 704 or step 706, the mechanism tags the identified explanatory clauses within passages with an 'EXPLANATORY' tag (step 708). The mechanism also appends the identified explanatory clauses to the set of previously identified explanatory clauses (statistical/machine learning model) (step 710) in order to improve those explanatory clauses identified using the set of previously identified explanatory clauses (statistical/machine learning model), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for generating answers to 'Why' questions by identifying an input question as a 'Why' question that seek explanations as answers. The mechanisms of the illustrative embodiments analyze the questions to generate one or more explanatory search queries that are utilized to perform a search of the corpus of information. The mechanisms of the illustrative embodiment search the corpus of information to identify passages that have explanatory clauses and provide an explanatory answer to the identified 'Why' question. The identified explanatory answers with 'Why' question explanatory clauses are then identified as candidate answers and scored for relevancy to the 'Why' question. The scored candidate answers are then provided to the user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory having instructions which, when executed by the processor, cause the processor to generate candidate answers to an explanatory question, the method comprising:
    responsive to identifying an input question as the explanatory question, decomposing, by the data processing system, the explanatory question into one or more explanatory queries;
    identifying, by the data processing system, one or more passages within a corpus of information that comprise an explanatory clause that provides an explanatory answer to the explanatory question based on pre-determined explanatory clause terms, wherein a passage within the one or more passages within the corpus of information that comprises the explanatory clause is identified by the method comprising:
        comparing, by the data processing system, each identified clause within a passage to a set of previously identified explanatory clauses; and
        responsive to the identified clause within a passage corresponding to one of the set of previously identified explanatory clauses, tagging, by the data processing system, the clause within the passage with an 'EXPLANATORY' tag;
    receiving, by the data processing system, hypothesis evidence with one or more passages comprising explanatory clauses from the corpus of information;
    generating, by the data processing system, one or more candidate explanatory answers based on hypothesis evidence;
    ranking and merging, by the data processing system, the one or more candidate explanatory answers; and
    outputting, by the data processing system, the one or more candidate explanatory answers.

2. The method of claim 1, wherein identifying the input question as the explanatory question comprises:
    comparing, by the data processing system, the input question to a set of annotated questions in order to identify whether or not the input question is seeking an explanation of an underlying reasoning as to the existence of a particular fact; and
    responsive to the input question corresponding to one of the set of annotated questions, tagging, by the data processing system, the input question as a 'EXPLANATORY' question.

3. The method of claim 2, further comprising:
    adding, by the data processing system, the explanatory question to the set of annotated questions for use in further training and prediction of future explanatory questions.

4. The method of claim 1, wherein identifying the input question as the explanatory question comprises:
    parsing, by the data processing system, the input question for a beginning portion of the input question;
    comparing, by the data processing system, the beginning portion of the input question to a predetermined set of explanatory question rules; and
    responsive to the input question corresponding to one of the predetermined set of explanatory question rules, tagging, by the data processing system, the input question as a 'EXPLANATORY' question.

5. The method of claim 1, wherein identifying the input question as the explanatory question comprises:
    parsing, by the data processing system, the input question for a beginning and ending portion of the input question;
    comparing, by the data processing system, the beginning and ending portion of the input question to a predetermined set of explanatory question rules; and
    responsive to the input question corresponding to one of the predetermined set of explanatory question rules, tagging, by the data processing system, the input question as a 'EXPLANATORY' question.

6. The method of claim 1, wherein identifying the one or more passages within the corpus of information queries each passage within the corpus of information.

7. The method of claim 1, wherein identifying the one or more passages within the corpus of information is limited to passages with clauses that are tagged with an 'EXPLANATORY' tag.

8. The method of claim 1, wherein identifying the passage within the one or more passages within the corpus of information that comprises the explanatory clause is further identified by the method comprising:
    appending, by the data processing system, the identified clause to a set of previously identified explanatory clauses.

9. A computer program product comprising a non-transitory computer readable storage medium having a computer readable program stored therein, wherein the computer readable program, when executed on a computing device, causes the computing device to:
    responsive to identifying an input question as an explanatory question, decompose the explanatory question into one or more explanatory queries;
    identify one or more passages within a corpus of information that comprise an explanatory clause that provides an explanatory answer to the explanatory question based on pre-determined explanatory clause terms, wherein a passage within the one or more passages within the corpus of information that comprises the explanatory clause is identified by the computer readable program further causing the computing device to:
  compare each identified clause within a passage to a set of previously identified explanatory clauses; and
  responsive to the identified clause within a passage corresponding to one of the set of previously identified explanatory clauses, tag the clause within the passage with an 'EXPLANATORY' tag;
receive hypothesis evidence with one or passages comprising explanatory clauses from the corpus of information;
generate one or more candidate explanatory answers based on hypothesis evidence;
rank and merge the one or more candidate explanatory answers; and
output the one or more candidate explanatory answers.

10. The computer program product of claim 9, wherein the computer readable program to identify the input question as the explanatory question further causes the computing device to:
  compare the input question to a set of annotated questions in order to identify whether or not the input question is seeking an explanation of an underlying reasoning as to the existence of a particular fact; and
  responsive to the input question corresponding to one of the set of annotated questions, tag the input question as an 'EXPLANATORY' question.

11. The computer program product of claim 10, wherein the computer readable program further causes the computing device to:
  add the explanatory question to the set of annotated questions for use in further training and prediction of future explanatory questions.

12. The computer program product of claim 9, wherein the computer readable program to identify the input question as the explanatory question further causes the computing device to:
  parse the input question for a beginning portion of the input question;
  compare the beginning portion of the input question to a predetermined set of explanatory question rules; and
  responsive to the input question corresponding to one of the predetermined set of explanatory question rules, tag the input question as an 'EXPLANATORY' question.

13. The computer program product of claim 9, wherein the computer readable program to identify the input question as the explanatory question further causes the computing device to:
  parse the input question for a beginning and ending portion of the input question;
  compare the beginning and ending portion of the input question to a predetermined set of explanatory question rules; and
  responsive to the input question corresponding to one of the predetermined set of explanatory question rules, tag the input question as an 'EXPLANATORY' question.

14. The computer program product of claim 9, wherein the computer readable program to identify the one or more passages within the corpus of information further causes the computing device to:
  query each passage within the corpus of information.

15. The computer program product of claim 9, wherein the computer readable program to identify the one or more passages within the corpus of information causes the computing device to:
  limit queries to passages with clauses that are tagged with an 'EXPLANATORY' tag.

16. The computer program product of claim 9, wherein the computer readable program to identify the passage within the one or more passages within the corpus of information that comprises the explanatory clause further causes the computing device to:
  append the identified clause to a set of previously identified explanatory clauses.

17. An apparatus comprising:
  a processor; and
  a memory coupled to the processor, wherein the memory comprises instructions which, when executed by the processor, cause the processor to:
  responsive to identifying an input question as an explanatory question, decompose the explanatory question into one or more explanatory queries;
  identify one or more passages within a corpus of information that comprise an explanatory clause that provides an explanatory answer to the explanatory question based on pre-determined explanatory clause terms, wherein a passage within the one or more passages within the corpus of information that comprises the explanatory clause is identified by the instructions further causing the processor to:
    compare each identified clause within a passage to a set of previously identified explanatory clauses; and
    responsive to the identified clause within a passage corresponding to one of the set of previously identified explanatory clauses, tan the clause within the passage with an 'EXPLANATORY' tag;
  receive hypothesis evidence with one or passages comprising explanatory clauses from the corpus of information;
  generate one or more candidate explanatory answers based on hypothesis evidence;
  rank and merge the one or more candidate explanatory answers; and
  output the one or more candidate explanatory answers.

18. The apparatus of claim 17, wherein the instructions to identify the input question as the explanatory question further causes the processor to:
  compare the input question to a set of annotated questions in order to identify whether or not the input question is seeking an explanation of an underlying reasoning as to the existence of a particular fact; and
  responsive to the input question corresponding to one of the set of annotated questions, tag the input question as an 'EXPLANATORY' question.

19. The apparatus of claim 17, wherein the instructions to identify the passage within the one or more passages within the corpus of information that comprises the explanatory clause further causes the processor to:
  append the identified clause to a set of previously identified explanatory clauses.

* * * * *